United States Patent
Zhou et al.

(10) Patent No.: US 8,878,522 B2
(45) Date of Patent: Nov. 4, 2014

(54) MAGNETIC LINEAR POSITION SENSOR

(75) Inventors: Xinyu Zhou, Troy, MI (US); Qiang Niu, Novi, MI (US); Kurt James Johnston, Ann Arbor, MI (US); Christopher G. Benson, Rochester Hills, MI (US); Daniel J. Smith, Ypsilanti, MI (US); Eric Thomas Carlson, Linden, MI (US); Moussa Ndiaye, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 328 days.

(21) Appl. No.: 13/332,029

(22) Filed: Dec. 20, 2011

(65) Prior Publication Data

US 2013/0154622 A1 Jun. 20, 2013

(51) Int. Cl.
*G01B 7/00* (2006.01)

(52) U.S. Cl.
USPC . 324/207.12; 324/205; 324/206; 324/207.11; 324/207.13; 324/207.17

(58) Field of Classification Search
USPC .......... 324/207.12, 205, 206, 207.11, 207.13, 324/207.17, 207.2, 207.21, 207.22, 207.23, 324/207.24, 207.26, 215, 244, 259, 260, 324/529, 178, 179, 146, 151 R
See application file for complete search history.

(56) References Cited

U.S. PATENT DOCUMENTS

| | | | |
|---|---|---|---|
| 7,868,510 B2 * | 1/2011 | Rittenhouse | 310/216.069 |
| 8,030,917 B2 * | 10/2011 | Hatanaka et al. | 324/207.25 |
| 8,102,172 B2 * | 1/2012 | Takeya et al. | 324/207.21 |
| 2008/0030188 A1 * | 2/2008 | Ponziani et al. | 324/207.2 |
| 2008/0294344 A1 * | 11/2008 | Sugiura | 702/6 |
| 2009/0153134 A1 * | 6/2009 | Matsumoto | 324/207.11 |

* cited by examiner

*Primary Examiner* — Huy Q Phan
*Assistant Examiner* — Temilade S Rhodes-Vivour

(57) ABSTRACT

A magnetic linear position sensor includes an array of N number of magnets. The array of magnets is distributed along a line to form a magnetic field relay along the line. The sizes and positions of the magnets in the array of magnets are symmetric along the line, and the size of the magnets decreases from the sides of the array of magnets towards the center of the array of magnets. The magnetic linear position sensor further includes a magnetic field sensor spaced apart and positioned above the array of magnets. The magnetic field sensor moves back and forth over the array of magnets to sense the magnetic field of the array of magnets.

18 Claims, 2 Drawing Sheets

MAGNETIC LINEAR POSITION SENSOR

FIELD

The present invention relates to magnetic sensors. More specifically, the present invention relates to magnetic linear position sensors.

BACKGROUND

The statements in this section merely provide background information related to the present disclosure and may or may not constitute prior art.

Many types of sensors are commonly employed in motor vehicles. For example, in many motor vehicle transmissions, clutch position sensors are used to determine the clutch position by reading the gauss field from a piston magnet. Further, a fork position sensor reads the gauss field radiated from a fork magnet to determine the gear state of the clutch. The magnets associated with the fork position sensor, however, typically interfere with the signals read by the clutch position sensor. To reduce this interference, shields for the fork magnet have been employed, but these shields have not proven to be very effective. In other arrangements, the size of the magnets for the clutch position sensor has been increased, or the distance between the fork magnet and the clutch position sensor magnet has been increased. These arrangements, however, introduce significant redesign and packaging issues.

Accordingly, there is a need in the art for an optimized magnetic linear position sensor with minimal magnetic mass that produces minimal magnetic interference to the surrounding environment.

SUMMARY

A magnetic linear position sensor includes an array of N number of magnets. The array of magnets is distributed along a line to form a magnetic field relay along the line and includes a first set of N1 magnets and a second set of N2 magnets, where N=N1+N2. The first set of N1 magnets is positioned on one side of a center of the array of magnets and the second set of N2 magnets is positioned on the other side of the center of the array of magnets. The size of the magnets decreases from the sides of the array of magnets towards the center of the array of magnets. The magnetic linear position sensor further includes a magnetic field sensor spaced apart and positioned above the array of magnets. The magnetic field sensor moves back and forth over the array of magnets to sense the magnetic field of the array of magnets.

Various embodiments of the magnetic linear position sensor may include one or more of the following benefits. The optimization of the sensor can minimize the magnetic mass. The sensor produces minimal magnetic interference to the surrounding environment. The performance of the sensor has very high linearity and a very long sensing distance.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1A:
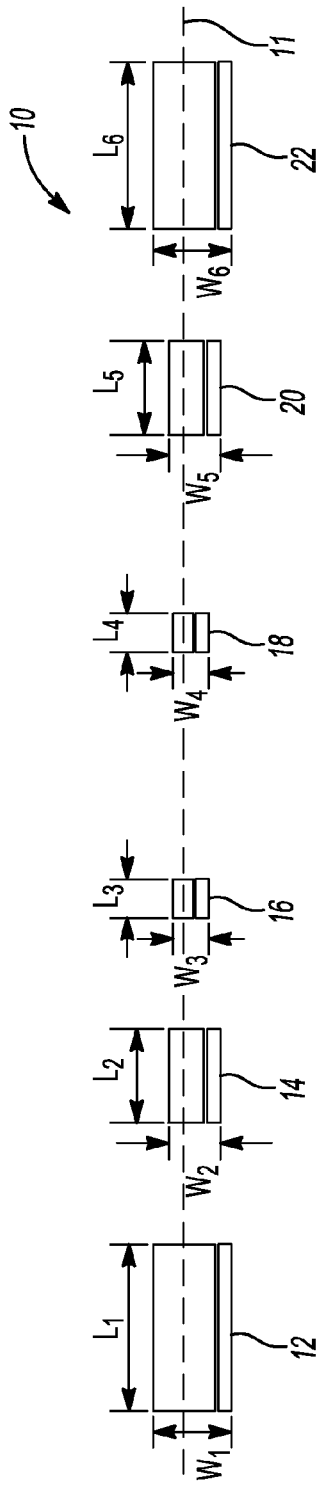
FIG. 1A is a top view of an array of magnets for a magnetic linear position sensor in accordance with the principles of invention.
Figure 1B:
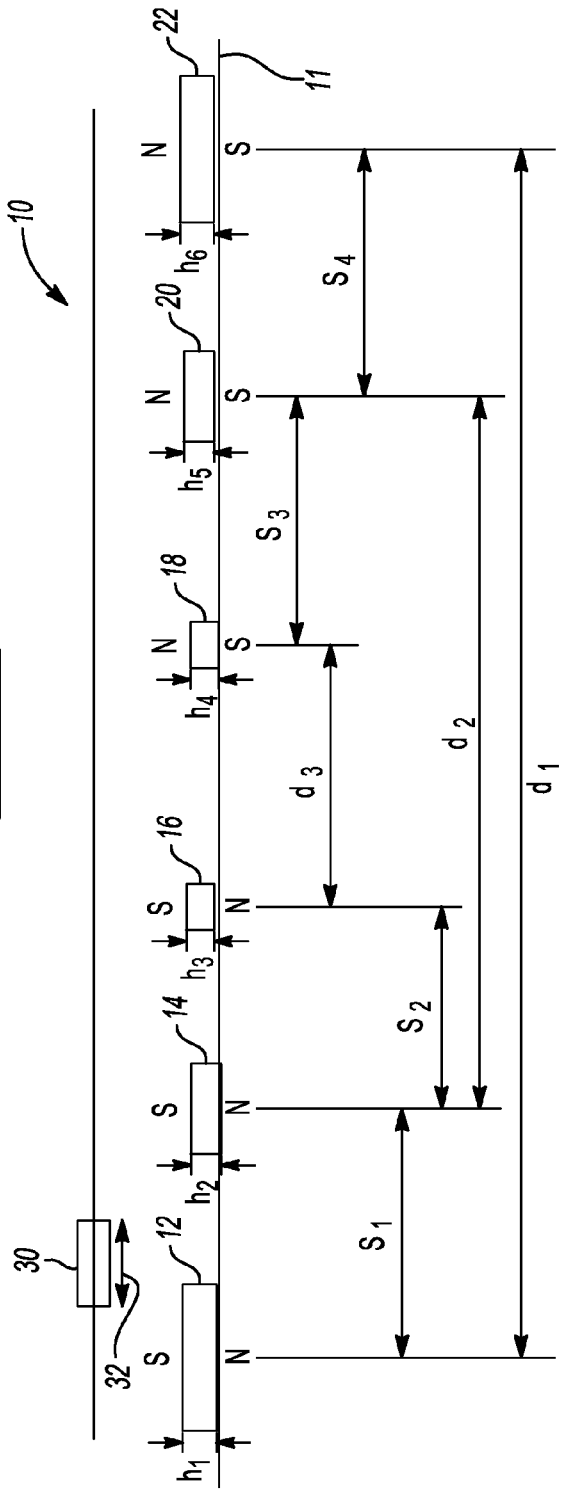
FIG. 1B is a side view of the magnetic linear position sensor of FIG. 1.

Referring now to FIGS. 1A and 1B, a magnetic linear position sensor is illustrated and designated at 10. The primary components of the magnetic linear position sensor include magnets 12, 14, 16, 18, 20, and 22 and a magnetic field sensor 30 spaced above the magnets 12, 14, 16, 18, 20, and 22. The sensor 30 can be, for example, a hall element that moves back and forth over the top of the magnets as indicated by the double arrow 32. The magnets 12, 14, 16, 18, 20, and 22 have a width, a length and a height of $W_i$, $L_i$, $h_i$, where i=1, 2, 3, 4, 5, 6 for the magnets 12, 14, 16, 18, 20, and 22, respectively. The centers of the magnets 12 and 22 are spaced apart by a distance $d_1$; the centers of the magnets 14 and 20 are spaced apart by the distance $d_2$; and the centers of the magnets 16 and 18 are spaced apart by the distance $d_3$. The spacing between the centers of the magnets 12 and 14, magnets 14 and 16, magnets 18 and 20, and magnets 20 and 22 are $S_1$, $S_2$, $S_3$, and $S_4$, respectively. In the particular arrangement shown in FIGS. 1A and 1B, the number of magnets, N, is six. In general, however, N can be as few as two or more than six. Further, when N is less than or greater than six, the magnetic fields of the first N1 are opposite the second N2. Hence, in the arrangement shown in FIGS. 1A and 1B N1=N2=N/2, where the magnets 12, 14, and 16 are opposite of the magnetic fields of the magnets 18, 20, and 22.

Generally, the sizes and positions of the magnets may or may not be symmetric along the centerline 11. For the arrangement shown in FIGS. 1A and 1B, $L_1=L_6$, $W_1=W_6$, $h_1=h_6$; $L_2=L_5$, $W_2=W_5$, $h_2=h_5$; and $L_3=L_4$, $W_3=W_4$, $h_3=h_4$. And $S_1=S_4$ and $S_2=S_3$. Further, for the particular arrangement shown in FIGS. 1A and 1B, note that the heights of the magnets are the same while their lengths and widths decrease from the sides of the array towards the center; that is, $L_1>L_2>L_3$, $L_6>L_5>L_4$, $W_1>W_2>W_3$, $W_6>W_5>W_4$, and $h_1=h_2=h_3=h_4=h_5=h_6$.

Figure 2:
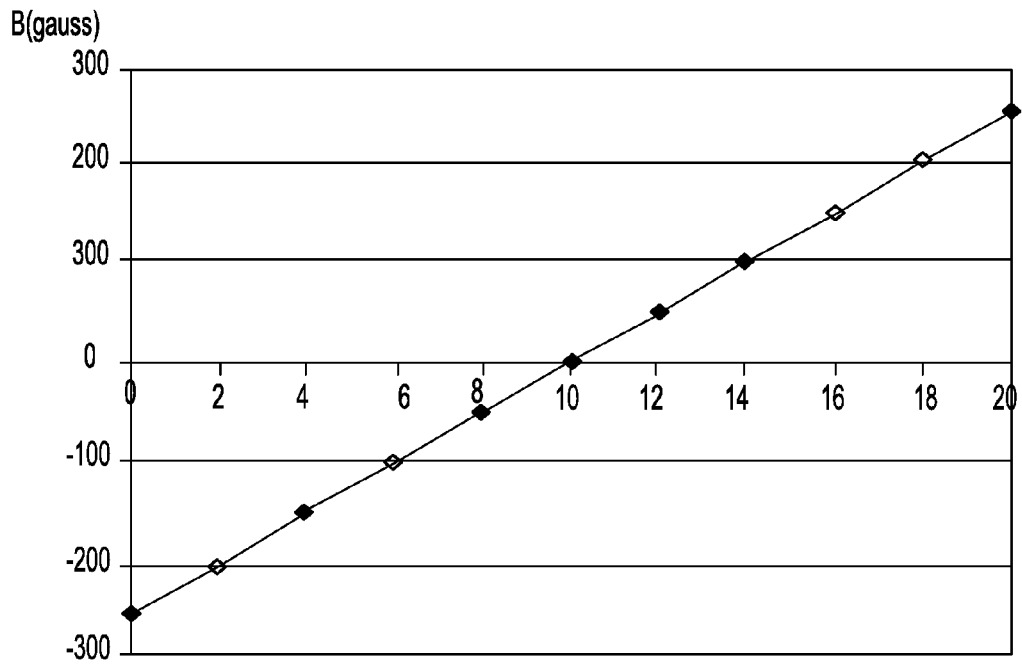
FIG. 2 is a graph illustrating the performance of the linear position sensor.

To determine the appropriate size and positions of the magnets 12, 14, 16, 18, 20, and 22, the size and positions are varied such that they are optimized for form a linear relationship of the magnetic field strength (in the top-down direction) to the location of the magnetic field sensor 30 along its path 32 as shown in FIG. 2.

Figure 3:
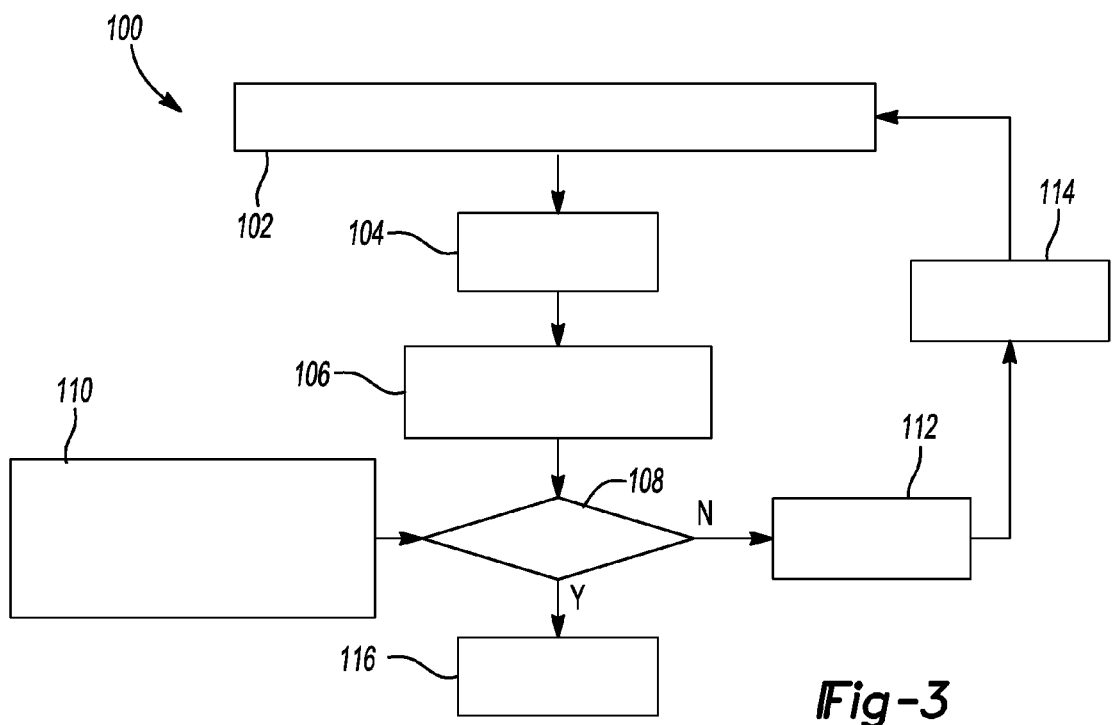
FIG. 3 is a flow chart of a process for optimizing the magnetic linear position sensor.

Referring now to FIG. 3, there is shown a process 100 for optimizing the size of the magnets and their positions of the magnetic linear position sensor 10. In step 102, initial values for the magnets lengths, widths, thickness or height, and their positions are set. In step 104, the process 100 employs a simulation algorithm to simulate the performance of the magnetic linear position sensor 10 for the initial values chosen in step 102. Then in step 106, the process 100 yields the results of the simulation analysis of step 104. Specifically, the performance results includes the sensing range of the magnetic sensor 10, the linearity of the sensor 10, for example, as shown in FIG. 2, the size of the magnets, and the signal range of the sensor 10.

Next, in a decision step 108, the process compares the simulations results of step 106 with the sensor design objectives for step 110. The design objectives, for example, may require that: the sensing range exceeds a range, L; the linearity is less than a value K; the sensor signal range is greater than a minimum B0 and less than a maximum B1; and the sizes of the magnets are minimized, that is, the size of the magnets do not exceed a maximum size.

If in step 108 the sensor performance results of step 106 meets the sensor design objectives specified in step 110, then the process 100 proceeds to step 116 specifying that the optimal sensor design has been achieved. If, however, the results of step 106 do not meet the objectives of step 110, then the process 100 proceeds to step 112. In step 112, the process 100 employs an optimization algorithm to propose a new sensor design in step 114. The process then takes the proposed magnet lengths, widths, thickness, and positions of step 114 and employs these new valves as the initial valves provided as inputs to the process 100 in step 102. The process 100 proceeds through the steps as described above until the optimal sensor design is provided in step 116 for the magnetic linear position sensor 10.

Accordingly, the process 100 optimizes the size of the magnets and the distance between them to minimize the total magnetic mass employed in the magnetic linear position sensor 10. Further, the optimized sizes and distances increases the linearity of the sensor to a very high level as illustrated in FIG. 2, and a very long sensing distance can be realized with a minimum amount of magnetic mass.

The description of the invention is merely exemplary in nature and variations that do not depart from the gist of the invention are intended to be within the scope of the invention. Such variations are not to be regarded as a departure from the spirit and scope of the invention.

What is claimed is:

1. A magnetic linear position sensor comprising:
   an array of N number of magnets distributed along a line to form a magnetic field relay along the line, the array of magnets including a first set of N1 magnets and a second set of N2, where N=N1+N2, the first set of N1 magnets being positioned on one side of a center of the array of magnets and the second set of N2 magnets being positioned on the other side of the center of the array of magnets, the size of the magnets decreasing from the sides of the array of magnets towards the center of the array of magnets; and
   a magnetic field sensor spaced apart and positioned above the array of magnets,
   wherein the magnetic field sensor moves back and forth over the array of magnets to sense the magnetic field of the array of magnets, the magnetic linear position sensor having performance characteristics that include a sensing range, a linearity of the magnets, a size of each magnet, and a sensor signal range, and
   wherein the performance characteristics are compared to sensor design characteristics to determine if the sensing range exceeds a minimum range, if the linearity is less than a maximum allowable value, if the sensor signal range exceeds a minimum value and is less than a maximum value, and if the total magnet size is less than a maximum value such that an optimal configuration of the array of magnets is set if the performance characteristics meet the sensor design objectives.

2. The magnetic linear position sensor of claim 1 wherein the magnetic field sensor is a Hall element.

3. The magnetic linear position sensor of claim 1 wherein the size of each magnet is defined by a respective width, length, and height.

4. The magnetic linear position sensor of claim 3 wherein the lengths of the magnets decrease from the sides of the array towards the center of the array.

5. The magnetic linear position sensor of claim 3 wherein the widths of the magnets decrease from the side of the array towards the center of the array.

6. The magnetic linear position sensor of claim 1 wherein N1=N2 and N is an even number.

7. The magnetic linear position sensor of claim 1 wherein N is an odd number.

8. The magnetic linear position sensor of claim 1 wherein N≥3.

9. The magnetic linear position sensor of claim 1 wherein N=6.

10. The magnetic linear position sensor of claim 1 wherein the magnetic linear position sensor is a fork position sensor in a motor vehicle transmission.

11. A method of optimizing a magnetic linear position sensor, the method comprising:
    setting initial values of an array of N number of magnets, the initial values including each magnets length, width, height and position, the array of N number of magnets being distributed along a line to form a magnetic field relay along the line, the array of magnets including a first set of N1 magnets and a second set of N2 magnets, where N=N1+N2, the first set of N1 magnets being positioned on one side of a center of the array of magnets and the second set of N2 magnets being positioned on the other side of the center of the array of magnets;
    simulating the performance of the magnetic linear position sensor, the simulation including a magnetic field sensor spaced apart and positioned above the array of magnets, the magnetic field sensor moving back and forth over the array of magnets to sense the magnetic field of the array of magnets, the magnetic linear position sensor performance including the sensing range, the linearity of the magnets, the size of each magnet, and the sensor signal range;
    comparing results of the simulation of the performance of the magnetic linear position sensor with sensor design objectives, comparing results including determining if the sensing signal range exceeds a minimum range, if the linearity is less than a maximum allowable value, if the sensor signal range exceeds a minimum value and is less than a maximum value, and if the total magnet size is less than a maximum value;
    setting an optimal configuration of the array of magnets if the simulation results meet the sensor design objectives; and
    optimizing the array of magnets with a new set of length, width, height, and position for each magnet and resetting the initial values of the array of magnets with the new set of length, width, height, and position for each magnet.

12. The method of claim 11 wherein the sizes and positions of the magnets in the array of magnets is symmetric along the line, the size of the magnets decreasing from the sides of the array of magnets towards the center of the array of magnets.

13. The method of claim 11 wherein the lengths of the magnets decrease from the sides of the array towards the center of the array.

14. The method of claim 13 wherein the widths of the magnets decrease from the side of the array towards the center of the array.

15. The method of claim 11 wherein N1=N2 and N is an even number.

16. The method of claim 11 wherein N≥3.

17. The method of claim 11 wherein N=6.

18. The method of claim 11 wherein the magnetic linear position sensor is a fork position sensor in a motor vehicle transmission.

* * * * *